July 21, 1953 G. B. DOREY 2,646,137
BRAKE SLACK ADJUSTER
Filed Aug. 12, 1950 3 Sheets-Sheet 3
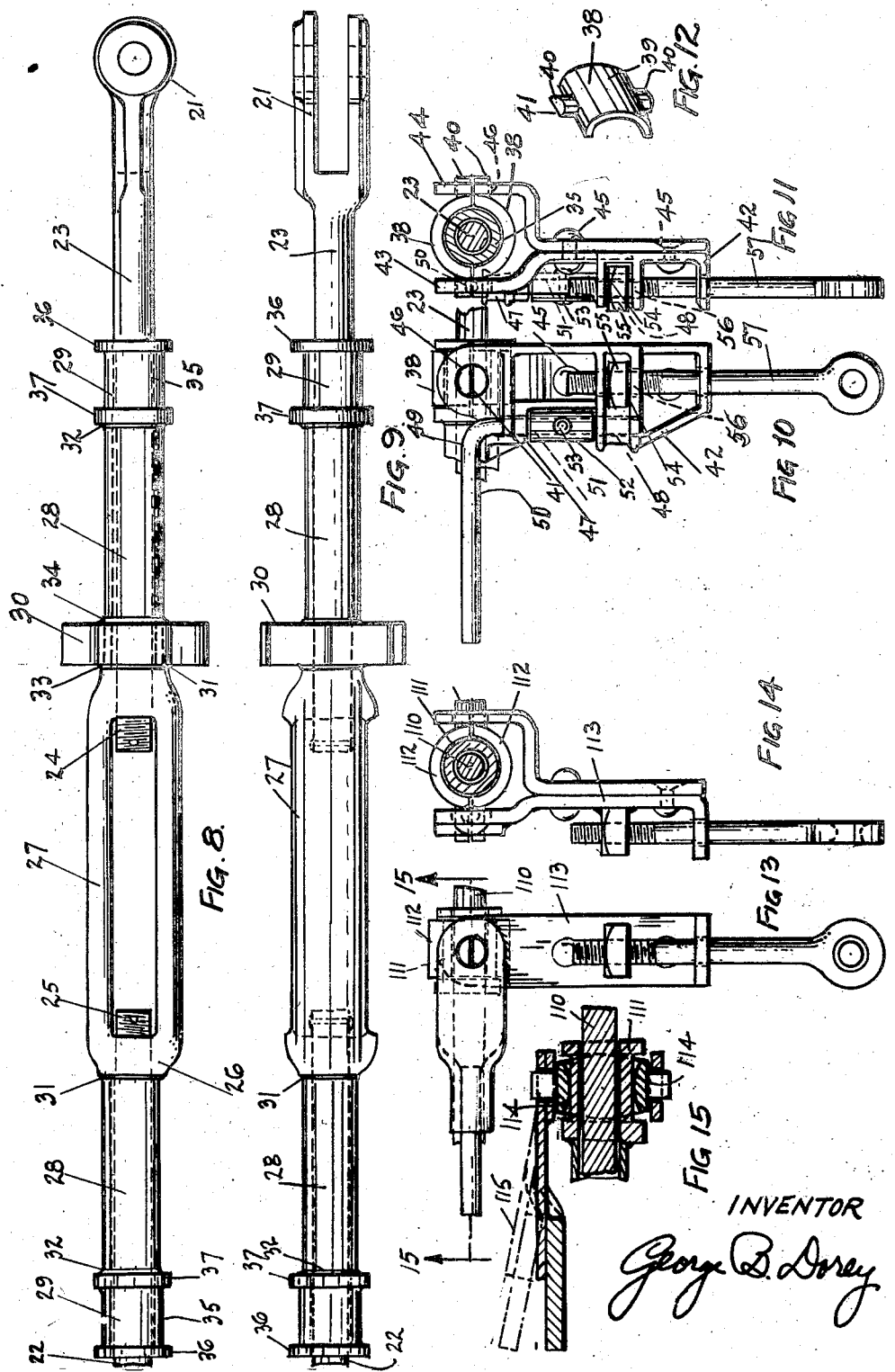
INVENTOR
George B. Dorey Patented July 21, 1953

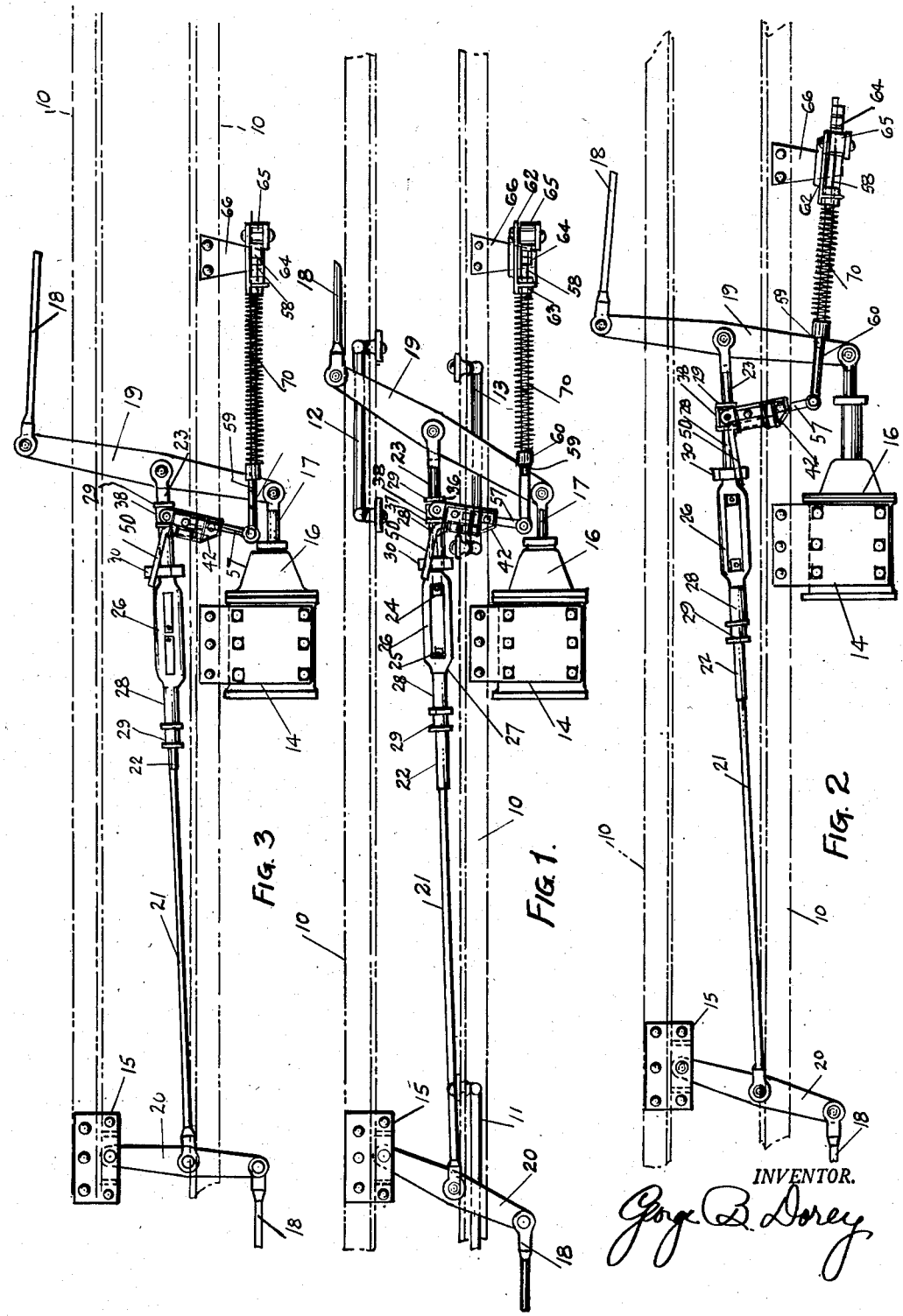

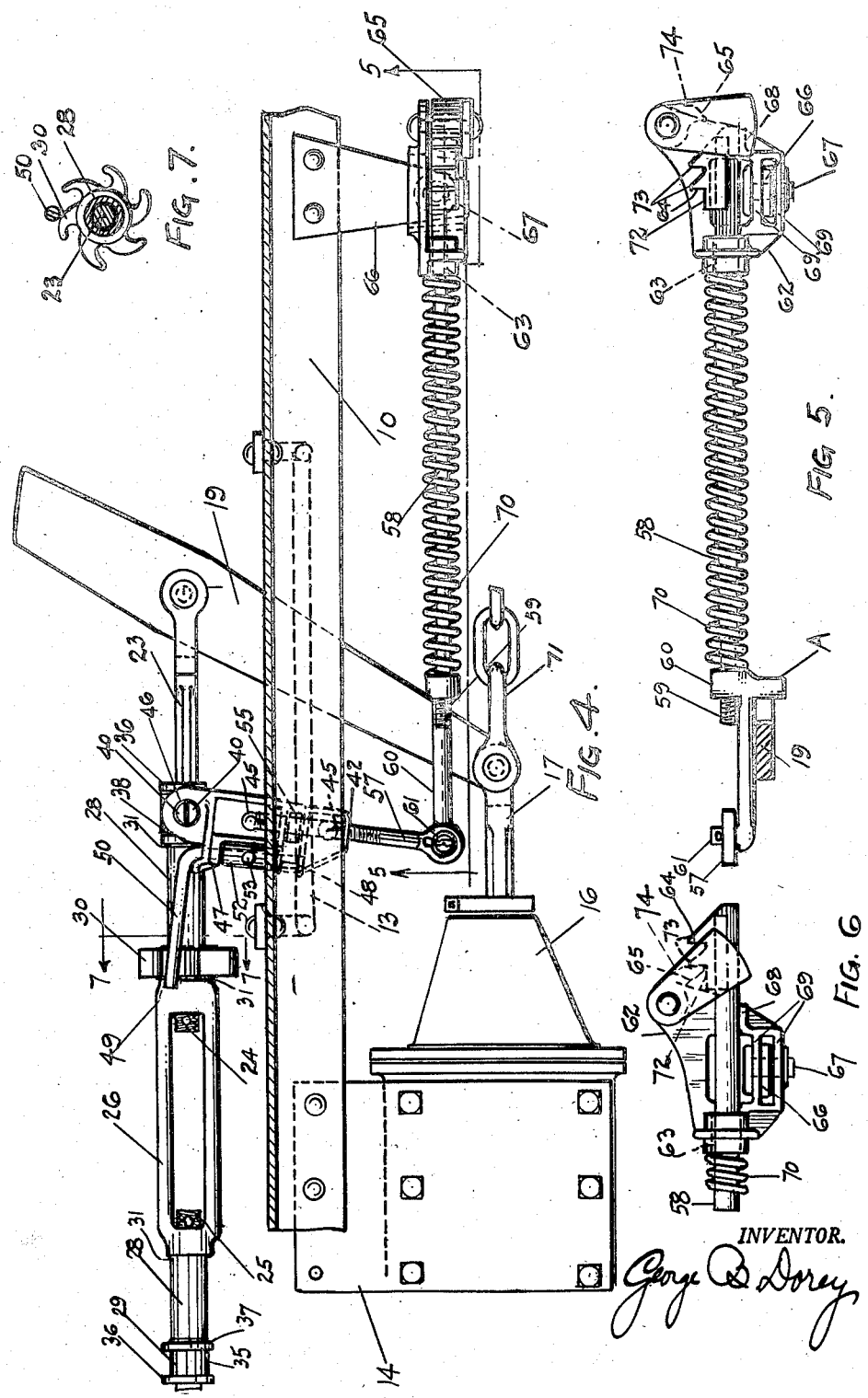

2,646,137

UNITED STATES PATENT OFFICE 2,646,137

BRAKE SLACK ADJUSTER

George B. Dorey, Montreal, Quebec, Canada, assignor to Continental Transport Appliances, Limited, Montreal, Quebec, Canada, a corporation of Canada Application August 12, 1950, Serial No. 179,046

14 Claims. (Cl. 188—200)

1

My invention relates to an improved brake slack adjuster for use in connection with the air brake systems of railway cars and the like.

The objects of the invention among others are: to automatically maintain the brake cylinder piston travel within prescribed limits; to provide a mechanism for automatically shortening a center tie rod upon excessive movement of the piston whereby said shortening is effective by means responsive to movement of the piston; to provide an improved bell crank lever structure for operating a ratchet wheel fixedly associated with a screw take up device whereby an arm of the bell crank will swing in one direction to engage the ratchet and movable independently thereof when swung in the opposite direction; and to provide an improved structure wherein a spring is compressed during the power applying movement of the piston and such compression held until such time as excessive movement of the piston takes place.

My invention further resides in details concerned with a screw take up device and in the mounting of a bell crank lever thereon in such a manner as to present a universal joint between the lever and screw take up device.

For further comprehension of my invention reference may be had to the accompanying drawings wherein:

Figure 1 is a plan view of the brake lever system of a railway freight car showing my improved slack adjuster applied thereto with the parts in released position.

Figure 2 is a plan view similar to Figure 1 except that the lever system is shown with the brake partially applied, the piston being shown as positioned at 7 inches of travel.

Figure 3 is a plan view similar to Figure 1 except that the lever system is shown with the center top connection shortened with the take up travel fully taken up.

Figure 4 is a plan view of the slack adjuster on an enlarged scale illustrating the parts as positioned with the brakes in released position.

Figure 5 is a side elevational view of the adjuster spring mechanism as shown with the parts in released position, said view being taken on a line 5—5 of Figure 4.

Figure 6 is a vertical side elevational view of the outer portion of the spring mechanism illustrating the position of the parts with the pawl shown in engagement with the ratchet bar.

Figure 7 is a vertical sectional view taken through the center top connection structure as taken on a line 7—7 of Figure 4.

Figure 8 is a detached plan view on an enlarged scale of the center rod structure.

Figure 9 is a vertical side elevational view of the structure shown in Figure 8.

Figure 10 is a plan view on an enlarged scale of the bell crank lever assembly.

Figure 11 is a vertical side view of the structure shown in Figure 10 as viewed from right to left.

Figure 12 is a perspective view of one of the pair of universal joint members.

Figure 13 is a plan view of an alternate form of bell crank structure which may be used in connection with my improvement.

Figure 14 is a vertical elevational side view of the structure shown in Figure 13 as viewed from right to left.

Figure 15 is a vertical sectional view taken on a line 15—15 of Figure 14.

In said drawings, referring first to Figures 1 to 3 inclusive, there are indicated by conventional dot and dash lines the usual center sills of the underframe designated by the numerals 10—10, and secured thereto are the usual brake lever supports 11, 12 and 13 and also supports for the brake cylinder and the dead lever as indicated at 14 and 15 respectively.

The brake cylinder 16, which is bolted or otherwise secured to the support 14, is provided with a push rod 17 adapted to be moved outwardly upon admission of compressed air to the cylinder, and constitutes the power operating means of the air brake.

The brake system generally includes top rods 18 which lead to the trucks (not shown) at the respective ends of the car for operating the brake shoes (not shown). The lever system extending between the top rods and push rod includes live and dead levers indicated at 19 and 20 respectively, and said levers are connected together intermediate the ends thereof by a center top connecting structure 21. The center connection structure 21 in the embodiment of my invention shown herein includes two end sections indicated at 22 and 23 respectively which extend from their respective levers, and the adjacent ends of the connections are screw threaded to present right and left hand threads as indicated at 24 and 25 respectively. The said threaded sections are united by means of a screw threaded take up device 26 having complementary threads engaging with said end sections.

The take up device 26 is preferably in the form of a turnbuckle 27 having hollow sleeves 28 at each end thereof, each fitted at its outer end with a guiding collar 29 within which the respective rod sections 22 and 23 are supported and guided beyond their threaded sections. At the end of the turnbuckle 27 which lies adjacent the live lever there is fitted on the sleeve 28 a ratchet wheel 30 which is nonrotatably mounted with respect to the turnbuckle.

Each said sleeve 28 is welded at one end to the turnbuckle at 31 and at the opposite end to the associated collar 29 as at 32 and the ratchet wheel 30 is also preferably welded as at 33 and 34 to the turnbuckle 27 and sleeve 28 respectively.

Said rod sections 22 and 23 are thus supported at the threaded ends 24 and 25 by the turnbuckle 27 and at an appreciable distance therefrom by means of the collars 29 thereby providing for an exceedingly stable self-supporting structure which is thus maintained against sagging.

The collars 29 are each provided with a circular bearing portion 35 lying between spaced side wall flanges 36 and 37. Embracing the bearing portion 35 of the collar 29 which lies adjacent the live lever there is disposed a split bearing formed of a pair of bearings 38—38. Each bearing 38 includes a semi-circularly shaped bearing portion 39 and includes a half round pivot 40 formed integrally therewith and the respective members 38 of the pair include a flat bearing face 41 so arranged as to be disposed in facing relation when the members are in operative position.

Pivotally mounted on the pair of bearings by means of the pivot sections 40 is the bell crank lever 42 and said lever is formed of two sections 43 and 44 united together by rivets 45 shaped to present a forked end arranged to straddle the center top rod connecting structure. The respective lever sections 43 and 44 are apertured at 46 and the pivotal sections 40 of the facing pair of bearing members 38 extend within the said apertures, the pair of bearings 38 being thereby held in position to function in the same manner as a one piece member.

The section 43 of the lever is provided at the side remote from the live lever with bearings 47 and 48 which form bearings for a round bar member 49, bent to angle shape to form arms 50 and 51. The arm 50 extends in the general direction of the center connecting rod structure and the adjacent arm 51 extends lengthwise of the lever and mounted in the bearings 47 and 48. The arm 51 constitutes a pivotal mounting allowing for upward swinging movement of the adjacent arm 50 which allows the latter to ride freely above the teeth of ratchet wheel 30 when swung in one direction and engaging therewith when swung in the opposite direction. The member 49 is maintained against axial movement by means of a tubular section 52 which is fitted over the arm 51 and retained in axial relation thereto by a rivet 53 and the said section 52 is maintained between bearings 47 and 48.

Adjacent the outer end of lever section 43 there is provided a pocket 54 within which a threaded nut 55 is disposed and held against lengthwise movement. Outwardly beyond the nut 55 the lever is provided with an aperture 56 through which a threaded eyebolt member 57 extends for threaded engagement with the nut.

The compressible mechanism includes a guiding and holding rod 58 which is screwthreaded at one end at 59 whereby a threaded connection is effected with a follower member 60 which in turn is pivoted at 61 to the bell crank lever. The follower member 60 is provided with a depending abutment A, Figure 5, which lies in the path of movement of the live lever 19 and is engaged thereby. The rod 58 at its opposite end is supported by an anchorage bracket 62 which is provided with a slotted aperture 63 through which the rod extends and beyond said aperture the rod is provided with a plurality of teeth 64 with which a locking pawl 65 engages, said pawl being pivotally mounted on the anchorage bracket 62.

The anchorage bracket 62 is preferably pivotally mounted on a stationary bracket 66 by means of a pivot 67, said bracket 66 being preferably in the form of a plate extending from and secured to the lower flange of the center sill.

The bracket 62 is generally of angle shaped formation with one section 68 horizontally disposed and formed with a pair of spaced walls 69—69 between which the bracket plate 66 is sandwiched and the other section vertically disposed and forming a support for the locking pawl 65.

Encircling the guide rod 58 is a coil spring 70 which is interposed between the follower member 60 and the anchorage bracket 62.

The compressible mechanism is disposed to one side of the pushrod, preferably between the latter and the connecting rod structure, thus facilitating the mounting of the mechanism so as not to interfere with the handbrake chain 71 which normally extends from the outer end of the push rod as indicated in Figure 4.

In the alternate modification of my invention as shown in Figures 13 to 15 inclusive, there is contemplated the use of a bell crank lever loosely mounted upon the connecting rod structure to oscillate in different planes for universal movement. In said Figures 13 to 15 inclusive the connecting rod structure is indicated generally at 110, the collar at 111, the pair of fulcrum bearings at 112 and the bell crank lever at 113. Said bearings 112 have their inner surface curved as at 114 to permit a limited degree of oscillatable movement and permit of the entire lever structure being tilted to clear the ratchet teeth, the extent of such movement being indicated in dash and dot lines at 115 to show the extreme lifted position of the lever arm.

The operation of the slack adjuster is as follows: assuming the brake in released position as shown in Figure 1 with the locking pawl hanging freely in a depending position beyond the rack teeth as best shown in Figure 5, the brake applying operation is effected by a forward movement of the push rod thereby moving the live lever forwardly and carrying along the bell crank lever 42 by reason of the co-operating engagement between the live lever and the depending abutment A of the follower 60. The forward movement of the follower 60 in turn results in a swinging movement of the bell crank lever which has the effect of swinging the arm 50 across the teeth of the ratchet wheel 30 permitting sufficient swinging movement of the arm to bring the lever arm 50 past the next succeeding tooth of the ratchet wheel. During the forward movement of the push rod the spring 70 is compressed and such compression held by the engagement between pawl 65 and the ratchet teeth 64 and the live lever 19 and push rod 17 are then free to return to normal released position independently of the bell crank lever 42.

In the normal operation of the brake the first of the teeth 64 is arranged to hold the springs 70 at a forward movement of the piston of approximately 5 inches and the next succeeding tooth at 6½ inches. Beyond the last tooth which holds the spring 70 at 6½ inches of piston travel there is provided a flat ledge 72 which holds the pawl 65 in the plane of the locking faces of the teeth and prevents disengagement of the pawl and teeth until such time as the piston travel exceeds 7 inches.

Upon continued movement of the piston in a brake applying direction the pawl 65 overrides the ledge 72 and drops to released position permitting release of the spring energy and actuation of the bell crank lever 42 to rotate the turnbuckle 27 in a take up direction as will be understood and the center tie rod structure will be shortened.

During the releasing movement of the spring 70 the upper surface 73 of the ratchet teeth 64 engages the rear wall 74 of the locking pawl 65 and causes the latter to ride on the ratchet teeth in inoperative position and upon completion of the release movement the pawl 65 again drops to the released position as indicated in Figure 5 in readiness for the next cycle of operations.

It will be observed by reference to Figures 1 and 3 that the fulcrum of the bell crank lever 42 on the center rod connecting structure is always in the same approximate relative position to the push rod 17 irrespective of the extent of movement of the screw take up device, this condition being rendered possible by reason of the take up being uniformly carried out on each side of the bell crank lever fulcrum.

The invention disclosed herein constitutes an improvement over the disclosures in my copending applications Serial No. 152,061, filed March 27, 1950, and Serial No. 164,871, filed May 29, 1950.

What I claim as new is:

1. In a slack adjuster for the brake leverage system of a railway car and the like comprising a screw threaded member and a complementary threaded element cooperating with the screw thread of said member to vary the length of the said member by rotation of the element, means for rotating the element including a toothed ratchet member fixedly mounted on the element, a lever extending in the general direction of the said element, support means mounting said lever to have oscillatable movement towards and away from the axis of rotation of said ratchet member, said lever being biased into operative engagement with said ratchet member to have driving engagement with one tooth thereof when bodily moved in one direction and to move freely over the ratchet teeth and independently thereof upon reverse bodily movement of the lever, operating means connecting a part of said brake leverage system to said lever to effect reverse bodily movement thereof on application of the brakes, and resilient means biasing said lever to effect bodily movement thereof in said one direction.

2. In a slack adjuster for an airbrake leverage system including a tie rod divided lengthwise into two sections and the adjacent ends of the respective sections screw threaded and a complementary screw threaded element connecting the respective sections; a ratchet wheel having a series of notches in the periphery thereof non-rotatably mounted on the element; an operating lever pivotally mounted at one side of the ratchet wheel to rock in a substantially horizontal plane and having an operating arm and another arm extending from said operating arm to intersect the periphery of the ratchet wheel and oscillatable to rock in a substantially vertical plane to gravitate into ratcheting engagement with the notches of the ratchet wheel when the lever is moved in one direction and ride over said notches and rock independently of said notches when moved in the reverse direction, said vertically rocking other arm of the lever being in the form of a rod bent to angular shape to present an arm extending contiguously with the operating arm of the lever and pivotally mounted on said operating arm.

3. In a slack adjuster for the brake leverage system of a railway car and the like comprising a connection rod having a screw threaded section and a complementary screw threaded element co-operating with the screw threaded section of the rod to vary the length of the connection rod by rotation of the element; means for rotating the element including a toothed ratchet member non-rotatably mounted on the element, a lever mounted for universal movement on the element and having one arm arranged to sweep in a generally horizontal plane across the periphery of said toothed ratchet member, and bearing means on said lever rockably mounting said arm whereby it is free to gravitate into clutch engagement with the teeth of said ratchet member when the lever is moved in one direction and move freely over the ratchet teeth and independently thereof upon reverse movement of the lever.

4. In a slack adjuster for the brake leverage system of a railway car and the like, in combination a dead lever, a live lever and a connecting tie rod structure extending between said levers at a location intermediate the ends thereof, said tie rod structure being divided lengthwise into two sections and the adjacent ends screw threaded and a complementary screw take up element connecting the respective sections and being rotatable for varying the length of the tie rod structure; a toothed ratchet wheel fixedly mounted on the element; a bell crank lever, means pivotally mounting said bell crank lever on said tie rod structure at a location spaced from said ratchet wheel to rock in a plane substantially parallel with the plane of movement of the live lever, said bell crank lever having angular related arms including an arm extending in the general direction of the live lever and another arm extending in the general direction of the tie rod structure, said last named arm being pivotally mounted with respect to the other arm of the bell crank lever to rock in a substantially vertical plane for ratcheting engagement with the teeth of the ratchet wheel.

5. In a slack adjuster for the brake leverage system of an air brake comprising a two-part tie rod connection including complementary screw threaded interengaging parts for varying the length of the tie rod connection by rotation of one of the parts, and a toothed wheel member fixedly mounted on said rotatable part; and a bell crank lever pivotally mounted on one of the parts of the connection, said lever having angularly related arms and one arm co-operating with the toothed member for rotating the same and having the other arm formed with a forked end straddling one of the parts of the tie rod connection; and the pivot mounting for said bell crank lever comprising a two-part bearing member embracing the straddled part of the connection, each said part of the bearing member having semi-circular trunnion projections arranged to be assembled with the flats in facing relation and the two semi-circular surfaces of a pair form complete circular trunnions on which the lever is arranged to swivel.

6. In a slack adjuster for the brake leverage system of a railway car and the like comprising a screw threaded tie rod connection and a complementary screw threaded element co-operating with the thread of said rod for varying the length of the connection by rotation of the element; a toothed ratchet member non-rotatably mounted on the element; and means co-operating with the teeth of the ratchet member for rotating the element, said means comprising a bell crank lever formed with angularly related arms and pivotally mounted with respect to the element to have rocking movement in different planes; one of the arms being arranged to sweep across and intersect the periphery of the ratchet wheel, means rockably mounting said one arm on the other arm to move towards the ratchet wheel to co-act with the teeth of the said ratchet and the other of said arms extending outwardly from the connection and having apertured forked ends straddling the connection; and the pivot mounting for said bell crank lever comprising a support for the forked end of the lever including a ring shaped bearing revolubly mounted on the element and formed with trunnions extending within the apertures of the lever.

7. In a slack adjuster for the brake system of a railway car and the like having live and dead levers, a push rod acting on the live lever for applying the brakes and a center tie rod connection connecting the respective levers intermediately the length thereof, said center tie rod connection being divided lengthwise and the respective sections united by a screw threaded take up element operable by rotation thereof; means for operating the take up element including a ratchet member fixedly associated with the element and a co-operating bell crank lever, means pivotally mounting said bell crank lever on said tie rod connection, said bell crank lever and having arms extending from its pivotal axis in angular relation, one of said arms being disposed for clutch engagement with the ratchet member and the other of said arms extending in the general direction of the live lever at one side thereof; and means acting on the last named arm for moving the same, said means including a follower having a body portion arranged to rest on the live lever and formed with oppositely disposed projections extending upwardly and downwardly respectively from the body portion, said upward extension engaging with the other arm of the bell crank lever and said downward extension being in the form of a lug lying in the plane of the live lever and engageable therewith upon movement of the push rod in a brake applying direction.

8. In a slack adjuster for the brake system of a railway car and the like having live and dead levers, a push rod acting on the live lever for applying the brakes and a center tie rod connection connecting the respective levers intermediately the length thereof, said center tie rod connection being divided lengthwise and the respective sections united by a screw threaded take up element operable by rotation thereof; means for operating the take up element including a ratchet member non-rotatably associated with the element and a co-operating bell crank lever, means pivotally mounting said bell crank lever on said tie rod connection, said bell crank lever and having arms extending from its pivotal axis in angular relation, one of said arms being disposed for clutch engagement with the ratchet member and the other of said arms extending in the general direction of the live lever at one side thereof; and means acting on the last named arm for moving the same upon movement of the push rod in a brake applying direction, said means including a follower member extending from the bell crank arm across the plane of the live lever and formed with a depending lug disposed in the path of movement of the live lever and engageable therewith.

9. In a slack adjuster for the brake system of a railway car and the like and including live and dead levers and power applying means acting on the live lever for applying the brakes, a center tie rod connection extending between the levers at a location intermediate the ends thereof, said center tie rod connection being divided lengthwise and the respective sections united by a screw threaded take up element operable by rotation thereof; means for operating the take up element including a ratchet fixedly associated with the element and a co-operating bell crank lever, means pivotally mounting said bell crank lever on said tie rod connection, said bell crank lever and having arms leading from its pivotal axis in angular relation, one of said arms being arranged for clutch engagement with the ratchet to move in engagement with the teeth thereof when swung in one direction and independently of said teeth when swung in the reverse direction, and the other of said arms extending in the general direction of the live lever; and means for moving the last named arm of the lever by movement of the power applying means comprising a follower connected to the bell crank arm and extending across the plane of the live lever and formed with a depending lug lying in the plane of movement of the said live lever; and means for moving the bell crank arm in the opposite direction, said last named means including resilient mechanism compressible upon movement of the brake applying means in a brake applying direction, and means for releasing said resilient mechanism at a predetermined extent of movement of the power applying means.

10. In a slack adjuster for the brake leverage system of a railway car structure and the like and having dead and live levers and a push rod acting on the live lever for applying the brake and a center tie rod connection connecting the levers intermediate the ends thereof, said center tie connection being divided lengthwise and the respective sections united by a screw threaded take up element operable by rotation thereof; means for operating the take up element including a toothed ratchet wheel fixedly mounted on the element and a co-operating bell crank lever, means pivotally mounting said bell crank lever on said tie rod connection, said bell crank lever and having arms extending from its pivotal axis in angular relation, one of said arms being arranged for clutch engagement with the ratchet wheel and the other of said arms extending in the general direction of the live lever and lying at one side thereof; and means acting on the last named arm for moving the same upon movement of the push rod in a brake applying direction, said means including a follower member extending from the bell crank arm across the plane of the live lever and formed with a depending lug disposed in the path of movement of the live lever and engageable therewith, and a spring interposed between the follower and the car structure and compressible during the brake applying movement of the live lever; means for retaining the spring under compression including a push bar extending through the spring and having one end anchored to the follower and ratchet teeth at the opposite end; an abutment on the car structure for supporting the ratchet end of the bar; and a pawl carried by the abutment for engagement with the ratchet teeth of the bar for holding the spring under compression until a predetermined extent of push rod travel is reached.

11. Automatic slack adjusting mechanism for a railway car braking system having brake applying means including live and dead levers connected to the braking system with the live lever connected for energization to a push rod and the levers interconnected by a connecting rod, said slack adjusting mechanism comprising a take up device adapted to be interposed in said braking system and on operation to vary the relation between the levers and push rod and thereby remove slack from the braking system, an actuating member adapted to be operatively connected to the braking system for movement in a forward direction in response to application of the brakes and operatively connected to said take up device for operating the same to remove slack from the braking system on movement of said actuating member in a reverse direction, means rockably mounting said actuating member on said take up device, said actuating member comprising a lever having an arm extending therefrom and rockable thereon in a plane transverse to the plane of rocking movement of said lever for connection to said take up device, spring means cooperating with said actuating member and tensioned thereby on its movement in said forward direction, and restraining means cooperating with said spring means for holding the same under tension on completion of forward movement of said actuating member less than through a predetermined extent and for releasing said spring means to move said actuating member in said reverse direction when the same has been moved through said predetermined extent and the brakes have been released.

12. Automatic slack adjusting mechanism for a railway car braking system having brake applying means including live and dead levers connected to the braking system with the live lever connected for energization to a push rod and the levers interconnected by a connecting rod, said slack adjusting mechanism comprising a take up device adapted to be interposed in said braking system and on operation to vary the relation between the levers and push rod and thereby remove slack from the braking system, an actuating member adapted to be operatively connected to the braking system for movement in a forward direction in response to application of the brakes and operatively connected to said take up device for operating the same to remove slack from the braking system on movement of said actuating member in a reverse direction, means rockably mounting said actuating member on said take up device, said actuating member comprising a lever having an arm extending therefrom and rockable thereon in a plane transverse to the plane of rocking movement of said lever for connection to said take up device, spring means cooperating with said actuating member and tensioned thereby on its movement in said forward direction, restraining means cooperating with said spring means for holding the same under tension on completion of forward movement of said actuating member less than through a predetermined extent, and means for releasing said spring means to move said actuating member in said reverse direction when the same has been moved through said predetermined extent on the presence of a predetermined amount of slack in said braking system and the brakes have been released.

13. Automatic slack adjusting mechanism for a railway car braking system having brake applying means including live and dead levers connected to the braking system with the live lever connected for energization to a push rod and the levers interconnected by a connecting rod, said slack adjusting mechanism comprising a take up device adapted to be interposed in said braking system and on operation to vary the relation between the levers and push rod and thereby remove slack from the braking system, a ratchet member connected to said take up device, a bell crank having one arm adapted to be operatively connected to the braking system for movement in a forward direction in response to application of the brakes and another arm rockably mounted thereon and biased into operative engagement with said ratchet member for moving the same to operate said take up device and remove slack from the braking system on movement of said bell crank in a reverse direction, spring means cooperating with said bell crank and tensioned thereby on its movement in said forward direction, and restraining means cooperating with said spring means for holding the same under tension on completion of forward movement of said bell crank less than through a predetermined extent and for releasing said spring means to move said bell crank in said reverse direction when the same has been moved through said predetermined extent and the brakes have been released.

14. Automatic slack adjusting mechanism for a railway car braking system having brake applying means including live and dead levers connected to the braking system with the live lever connected for energization to a push rod and the levers interconnected by a connecting rod, said slack adjusting mechanism comprising a take up device adapted to be interposed in said braking system and on operation to vary the relation between the levers and push rod and thereby remove slack from the braking system, a ratchet member connected to said take up device, a bell crank having one arm adapted to be operatively connected to the braking system for movement in a forward direction in response to application of the brakes and another arm rockably mounted thereon and biased into operative engagement with said ratchet member for moving the same to operate said take up device and remove slack from the braking system on movement of said bell crank in a reverse direction, spring means cooperating with said bell crank and tensioned thereby on its movement in said forward direction, restraining means cooperating with said spring means for holding the same under tension on completion of forward movement of said bell crank less than through a predetermined extent, and means for releasing said spring means to move said bell crank lever in said reverse direction when the same has been moved through said predetermined extent on the presence of a predetermined amount of slack in said braking system and the brakes have been released.

GEORGE B. DOREY.

References Cited in the file of this patent

UNITED STATES PATENTS

| Number | Name | Date |
| --- | --- | --- |
| 853,210 | Anderson | May 14, 1907 |
| 1,060,613 | Mars | May 6, 1913 |
| 1,508,764 | Benish | Sept. 16, 1924 |

FOREIGN PATENTS

| Number | Country | Date |
| --- | --- | --- |
| 221,555 | Great Britain | 1924 |